United States Patent [19]
Obenchain et al.

[11] 3,832,607
[45] Aug. 27, 1974

[54] COLUMN TYPE STACKED PLATE CAPACITOR

[75] Inventors: Keith T. Obenchain, Lafayette; James C. Jimerson, Indianapolis, both of Ind.

[73] Assignee: P. R. Mallory & Co., Inc., Indianapolis, Ind.

[22] Filed: Feb. 20, 1974

[21] Appl. No.: 444,234

[52] U.S. Cl................ 317/261, 29/25.42, 317/230
[51] Int. Cl............................................. H01g 1/14
[58] Field of Search................. 317/261, 242, 230; 29/25.42

[56] References Cited
UNITED STATES PATENTS
1,889,416  11/1932  Morshon........................... 317/230
3,086,150  4/1963   Held .............................. 317/261 X FOREIGN PATENTS OR APPLICATIONS
633,903  7/1936  Germany........................... 317/261
703,054  1/1954  Great Britain...................... 317/261

Primary Examiner—E. A. Goldberg
Attorney, Agent, or Firm—Charles W. Hoffmann; Robert F. Meyer

[57] ABSTRACT

A capacitor including stacked anode and/or cathode plates of a closed plane curve configuration such as a circular plate or a closed plane having one or more acute, obtuse or right angles such as a rectangular plate, with at least one tab and at least one notch provided in each plate. The plates are stacked so as to have substantially the same axis and interleaved with and separated by a dielectric separator. Position of the tabs are alternated radially in the stack and the tabs formed so as to project in a direction approximately perpendicular to the plane of the plates. A capacitor of this design has improved electrical performance characteristics such as a reduced impedance characteristic and an ability to better withstand high ripple currents. The design may also allow greater utilization of capacitor volume and ease of alignment of the capacitor plates during construction. The stacked plate design of the invention can also be adapted for feedthrough capacitors by providing for a plurality of tabs on each plate.

10 Claims, 9 Drawing Figures

PATENTED AUG 27 1974 3,832,607

PATENTED AUG 27 1974

COLUMN TYPE STACKED PLATE CAPACITOR

The present invention relates to capacitors and, more particularly, to capacitors of a stacked column type design.

Present utilizations of some capacitors have necessitated the development of high capacitance devices that will operate satisfactorily at high frequencies in the range of about 100KC to about 500 KC. Capacitors that operate at high frequencies have to have as low as possible equivalent series inductance so as to decrease the power dissipated within the capacitor. The equivalent series inductance of a capacitor is made up of several items including the series plate inductance and the series conductor inductances between the plates, the terminals and other parts of the circuit. Reducing the equivalent series inductance thereby reduces the impedance of the capacitor.

One means by which the effective series inductance can be reduced is by utilizing a multi-terminal capacitor to function as a feed-through capacitor. In the stacked plate type feed-through capacitors, each plate will usually have at least two terminals.

In many applications, a capacitor must be able to withstand high ripple current which may be associated with the circuit in which it is operating. Ripple current is usually defined as the alternating component of a substantially steady current. High ripple currents can adversely affect capacitor performance. Capacitors containing porous anodes of a multiplicity of small film-forming metal particles have less ability to withstand these rippler currents than capacitors of other configurations such as stacked plate type capacitors.

Previously produced capacitors of the stacked plate type have all had termination, usually by tabs or similar terminals, take place outside the plate volume and in the same plane as the plates. This has produced capacitors that were bulky since the total volume of the housing had to include sufficient volume to contain the terminals. Also termination means of this type produced an irregularly shaped capacitor which either had to have an irregularly shaped housing, which is more difficult to construct, to enclose the tabbed plates, or had to have a regularly shaped housing that required considerable non-capacitance contributing volume in containing the capacitor components.

The construction of stacked flat plate capacitors is complicated by difficulties encountered in alignment of the plates and tabs during stacking and during the operation of joining the tabs of plates of like polarity to each other in forming electrodes. If the plates are not aligned properly, assembly of the components in a housing can be difficult due to an irregular stack and there is a greater possibility of a plate contacting another plate of opposite polarity during capacitor operation and thereby possibly electrically short circuiting a portion of the device.

It is therefore a feature of the invention to provide a capacitor having a low equivalent series inductance. Another feature of the invention is that the capacitor is able to withstand high ripple currents. It is yet another feature of the invention that termination of the internal elements of the capacitor is accomplished so as to yield high capacitance for a given volume. It is another feature of the invention that total capacitor volume may be utilized to the maximum and terminal means do not occupy an inordinate amount of the capacitor volume. Another feature of the present invention is that alignment of the plates during capacitor construction may be facilitated by the plate configuration. Another feature of the present invention is that this design for a stacked plate capacitor can be utilized as a feed-through capacitor.

The foregoing features and advantages of the present invention will be more clearly understood when considered in conjunction with the accompanying drawing, in which;

FIG. 1 of the drawing is plan view of a generally circular shaped metal plate in accordance with the present invention.

Generally, the present invention comprises a stacked flat plate capacitor where improved terminal means are provided. Flat conductive plates of an etched, film-forming metal are used which have integral terminal tab or tabs which extend outwardly from the plate area. The plates are equipped with a notch or notches on the periphery. The plates of the capacitor are of a closed plane curve configuration such as a circular plate or a closed plane having one or more acute, obtuse or right angles such as a rectangular plate.

The capacitor also uses dielectric separators interleaved with and between each plate, the separators shaped generally the same as the metal plates except that the separators may contain notches in the same positions as the metal plates contain a tab and a notch. When utilized, the notches of the separators are approximately the same size as the notches of the plates. The separator is slightly larger in overall dimensions than a plate so as to insure that adjacent plates in a stack do not contact each other at the outer edges.

In construction of the capacitor, a plurality of flat plates are stacked on top of each other interleaved with the flat dielectric separators, the tab or tabs of each plate being alternated spacially with respect to the tabs of the nearest plates. For example, the tab of bottom plate would project in the opposite direction from the tab of the plate that is immediately on top of the bottom plate. The tab of the thid plate would project in the same direction as the tab of the bottom plate. Thus one half of the plates have their tabs projecting in one direction while the tabs of other half of the plates project in another direction. The tabs of each half are aligned vertically with the notches of the plates projecting in another direction and with the notches of all the spacers, if any. All the tabs of the plates are then bent in a direction approximately perpendicular to the plane of the plates to provide a capacitor plate stack with the tabs forming at least two electrodes. The bent tabs of each electrode are then connected to each other and to an external terminal means. The stack of plates and separators is enclosed in a suitable housing with an electrolyte to provide the finished capacitor.

The present invention provides a stacked plate capacitor with characteristics of low series inductance, ability to withstand high ripple currents, maximum utilization of available space and simpler construction due to ease of alignment of the plates.

Figure 1:
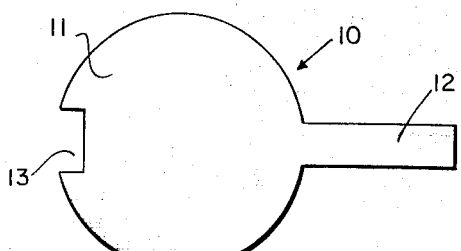

Referring now to FIG. 1 of the drawing, there is illustrated a flat conductive plate 10 which has a generally circular shape portion 11. It would be understood that plate 10 can be a closed plane curve configuration such as a circular plate or a closed plane having one or more right angles such as a rectangular plate. The plate 10 includes an integral tab 12 and notch 13. The notch 13 is slightly wider than the tab 12 and has a depth of several times the thickness of the tab 12. The plates 10 may be fabricated from any film-forming conductive metal, preferably a thin uniform foil of aluminum, tantalum or niobium from about 0.0005 inches to about 0.010 inches in thickness with a dielectric oxide layer of the film-forming metal provided on the surface thereof. Most preferably the metal plate 10 is aluminum and is etched to provide a greater surface area before the dielectric oxide layer is formed on the plate.

Figure 2:
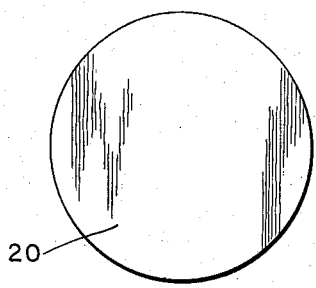
FIG. 2 is a plan view of a separator used in conjunction with the plate of FIG. 1 in a capacitor.

FIG. 2 is an illustration of a separator 20 of a generally circular configuration that may be used in conjunction with a generally circular, single tab metal plate 10 as shown in FIG. 1. The diameter of a circle generally defining the area of separator 20 would be slightly larger than the diameter of the circle defining the metal plate 10 that the separator would be used with in a capacitor. The use of a separator 20 with a slightly larger area than the plate portion 11 helps to prevent the edges of adjacent plates from contacting each other and thereby shorting the device.

Figure 3:
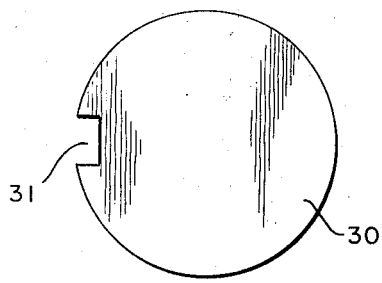
FIG. 3 is a plan view of a separator used in conjunction with the plate of FIG. 1 in the construction of a stacked capacitor.

FIG. 3 is an illustration of another dielectric separator 30 of a generally circular configuration that may be used in conjunction with a generally circular, single tab metal plate 10 as shown in FIG. 1. The separator 30 contains a notch 31 that is slightly wider than the width of the tab 12 of the metal plate 10 adapted for use with the separator. The depth of the notch 31 is several times the thickness of the metal plate 10.

Figure 4:
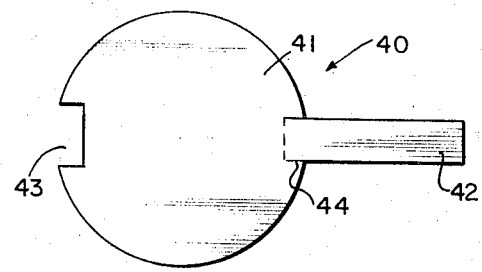
FIG. 4 is a modification of the conductive plate as shown in FIG. 1.

FIG. 4 illustrates another embodiment of a metal plate similar to the one shown in FIG. 1. The flat conductive plate 40 includes a generally circular shaped portion 41, tab 42 and notch 43. The notch 43 is slightly wider than tab 41 and has a depth of several times the thickness of the tab. Circular plate portion 41 has slits 44 which extend the edges of tab 42 into the area of plate portion and which provide another notch (not shown) in the plate when the tab is bent along the dotted line to a position approximately perpendicular to the plane of the plate portion 41.

The plates as shown in FIG. 1 and FIG. 4 may be modified for use in a feed-through capacitor by having a plurality of tabs per plate and a corresponding number of notches per plate.

Figure 5:
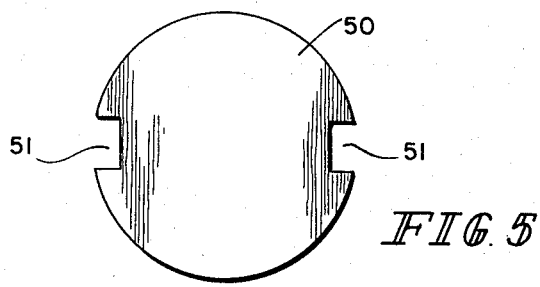
FIG. 5 is a plan view of a separator adapted for used with either the plate as shown in FIG. 1 or the plate as shown in FIG. 4.

FIG. 5 is an illustration of a dielectric separtor 50 of a generally circular configuration containing notches 51, that would be used in conjunction with a generally circular, single tab metal plate 40 as shown in FIG. 4. The diameter of a circle generally defining the area of separator 50 would be slightly larger than the diameter of the circle defining the metal plate 40 that the separator is used in conjunction with in a capacitor. The use of a separator 50 of slightly larger area than the plate 40 helps to prevent the edges of adjacent plates from contacting each other and thereby shorting the device. Notches 51 in the separator 50 are slightly wider than the tabs 42 of the metal plate 40 which allows for easy passage of the tabs through the notches.

In the construction of a multi-tab plate capacitor, such as a feed-through capacitor, the number of notches 51 contained in the dielectric separator 50 would be twice the number of tabs 42 that are on the metal plates 40 that the spacer is used within the capacitor.

The dielectric separators 20, 30, and 50 may be composed of a cellulosic material such as standard capacitor papers, a synthetic material such as nylon or plastic, or an open gauze when combined with a gelled electrolyte.

Figure 6:
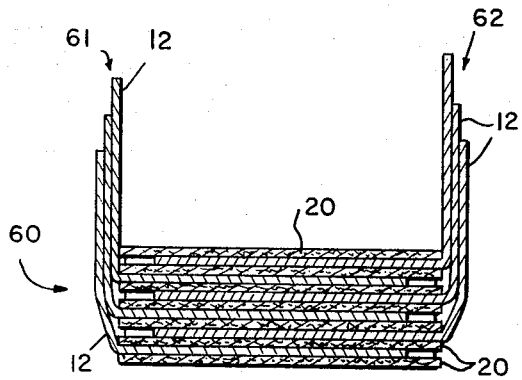
FIG. 6 is a cross-sectional view of one arrangement for stacking of the plates and separators for use in a capacitor.

FIG. 6 is an illustration of the stacking arrangement of a capacitor portion 60 utilizing circular plates 10 as are shown in FIG. 1. The plates are stacked in a vertical order with dielectric spacers 20, as are shown in FIG. 2, between each plate. Separators 30 of FIG. 3 or the separators 50 of FIG. 5 could also be used in this embodiment and it may be desirable to do so as alignment of the notches 51 of separators 50 with the tabs 12 would allow the bending of the tabs to take place closer to the plate stack since the separators are generally slightly larger in diameter than the plates 10. The plates 10 are alternated spacially as to the projection of the tab 12 and the tabs bend vertically, approximately perpendicular to the plane of the plates. The tabs 12 are joined together by welding to form anode terminal 61 and cathode terminal 62 respectively. In this embodiment, the plate termination take place outside of the stacked plate volume.

Figure 7:
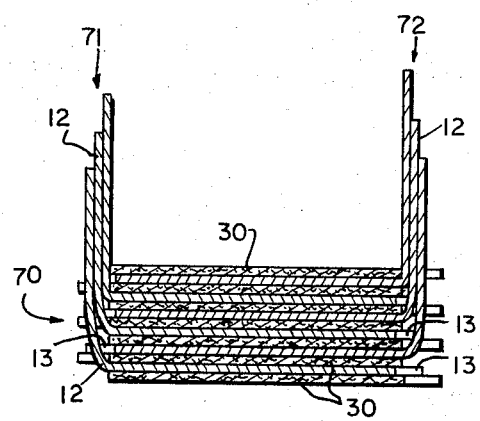
FIG. 7 is a cross-sectional view of another arrangement for stacking of the plates and separators for use in a capacitor.

FIG. 7 is a cross-sectional view of another stacking arrangement for a portion 70 of a capacitor. Plates 10 as shown in FIG. 1 are stacked with separators 30 as shown in FIG. 3 between each plate. Position of the tab 12 for each plate 10 is diametrically opposed to the tabs projecting from the plates adjacent to it. The plates 10 are stacked so as to have their notches 13 aligned with the tabs 12 of adjacent plates. The adjacent plates 10 are not axially aligned, but are slightly offset so when the tabs 12 are bent in a direction approximately perpendicular to the plane of the plates, the tabs will project through the notches 13 of the plates and the notches 31 of the separators 30.

Separators 30 are positioned in the stack so as to have their notches 31 aligned with the tab 12 of plate 10 immediately beneath the separator. Since the plates 10 are slightly offset, only having the separator 30 positioned in this manner will allow complete separation of the plates and still allow the tab 12 to pass inside the stacked plate volume.

Once the stack is completed, the tabs 12 projecting up each side of the stack are joined to each other to produce electrodes 71 and 72 respectively.

When viewed from the top, the completed stack of FIG. 7 is in a general eliptical shape since the plates 10 and separators 30 are stacked so that their respective axis are not in total alignment.

Figure 8:
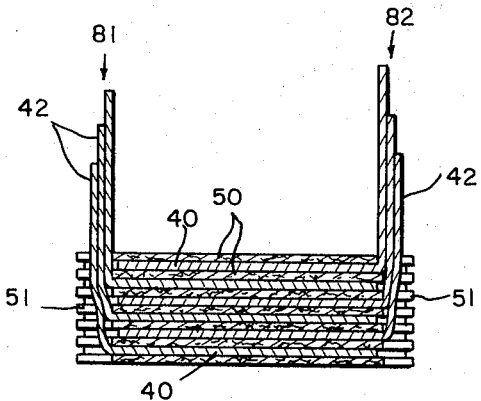
FIG. 8 is a cross-sectional view of another arrangement for stacking of the plates and separators for use in a capacitor.

FIG. 8 is a cross-sectional view of stacking arrangement of a capacitor portion 80 utilizing the plates 40 of FIG. 4 and the separators 50 of FIG. 5. In this embodiment, the plates 40 and separators 50 are alternately sacked with the tabs 41 of the plates alternating as to their projected direction. The notches 51 of the separators 50 are aligned with the notches 43 and tabs 42 of the plates 40. Stacking of the plates 40 and separators 50 is on the same axis and thus a generally circular stack results. After stacking, the tabs 42 are bent in a direction approximately perpendicular to the plane of the circular portion of the plate 40. Since the length of the tab 42 is extended by the slits 44, the projection of the tabs is through the notches 43 of the other plates 40 and the notches 51 of the separators 50. Once the tab 42 is bent along the line indicated by dots, another notch is created in the plate 40 which allows tabs from other plates of like polarity to project through the plate and contact the tab. Bending of the tabs 42 could take place either before or after stacking. Thus, termination of the plates 40 is accomplished inside the stacked plate volume.

When stacking is complete, the tabs 42 from plates 40 of like polarity are joined to each other at one or more places to provide anode terminal 81 and cathode terminal 82.

The embodiment of FIG. 6 is preferred when size of the completed capacitor is not a major consideration and because this embodiment offers the greatest ease of assembly. The embodiment of FIG. 7 provides a more regular stack and ease of alignment of the plates. The embodiment of FIG. 8 is preferred when the size of the completed capacitor is a major consideration and when maximum utilization of a regularly shaped housing is desired.

It should be understood that FIGS. 6, 7, and 8 merely illustrate a portion of a completed capacitor and the capacitor could contain many more plates than are illustrated. Also, the length of the tabs is not critical, just so long as the tabs are able to contact those adjacent tabs of like polarity.

Figure 9:
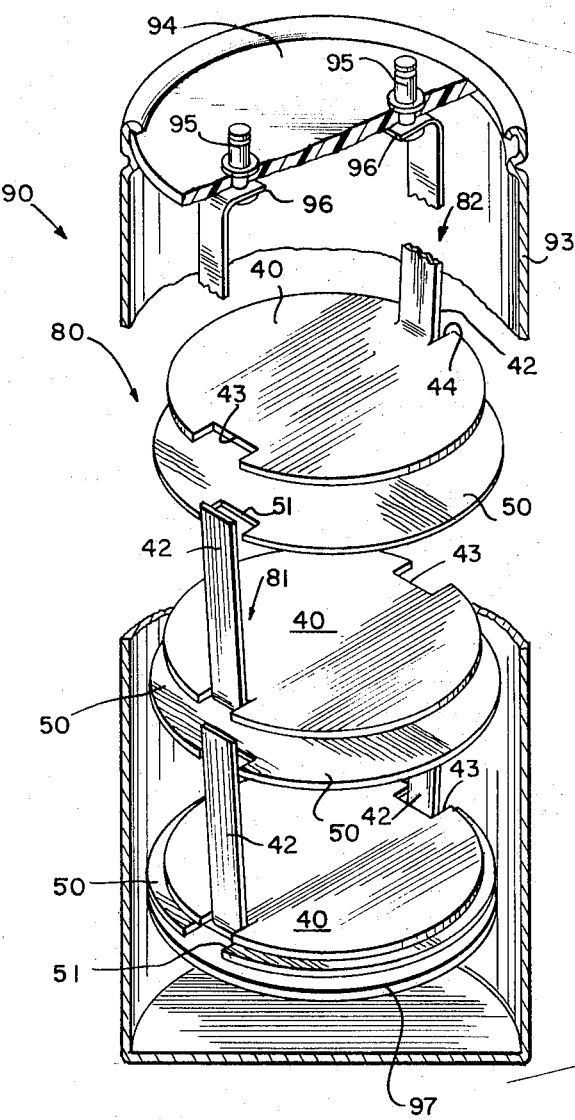
FIG. 9 is an exploded cross-section of a completed capacitor constructed according to one embodiment of this invention.

FIG. 9 is an exploded cross-section of a completed capacitor 90 utilizing the stacking arrangement of FIG. 8. The plates 40 are stacked in a vertical order with separators 50, as are shown in FIG. 5, between each plate. The separators 50 have notches 51 corresponding to the position of the tabs 42 and notches 43 of the metal plates 40. The plates 40 are alternated spacially as to the projection of the tab 42 and the tabs bent vertically, approximately perpendicular to the plane of the plates, to project through the notches 43 and 51 of the plates and separators 50. The tabs 42 are joined together by welding to form anode terminal 91 and cathode terminal 92 respectively. An electrolyte (not shown) with low resistivity and low viscosity is impregnated into the components of the capacitor 90. These components are then enclosed by a housing 93 and end seal 94 which has external contact means 95. Anode terminal 81 and cathode terminal 82 are connected to the external contact means 95 by conductive lead means 96. If the housing 93 is composed of a conductive material, an electrically insulating film (not shown) is wrapped around the stack and a thick, non-conducting spacer 97 is placed in the closed end of the housing to help prevent electrical contact between the plates 40 and the housing.

The electrolytes that can be employed in these stacked capacitors consists of systems having low resistivities, less than 500 ohm/cm, as well as low viscosities. Therefore, glycol-borate, non-aqueous (ethylene glycol monomethyl ether or dimethyl formamide), aqueous (saturated amonium pentaborate solution), azeotropic, and gelled electrolyte systems with resistivities of less than 500 ohm/cm may be used.

All metal-to-metal contacts (not shown) are secured by means of welding such as resistance, ultrasonic, laser, flux or electron beam welding, to produce the lowest possible resistance in the connection. The housing 93 and end seal 94 may be composed of a metal such as aluminum, or a thermosetting, non-inductive plastic material such as epoxy, phenolic, polycarbonate or nylon.

The capacitor 90 utilizing the stacking arrangement of FIG. 9 is more compact than most other stacked plate capacitor configurations since the tabbing or termination of the plates 40 is accomplished inside the stacked plate volume thereby providing a regularly shaped volume for easier encapsulation. By providing a regularly shaped volume, conventional housing for wound capacitors can be utilized for these stacked plate capacitors. Since little space is wasted in the total volume of the capacitor due to internal tabbing, more capacitance can be included in a given capacitor volume as compared to most other stacked plate capacitor configurations.

The use of notches 43 and 51 in conjunction with the bent tabs on the plates 40 in a capacitor according to this invention allows for easier alignment of the stacked plates during construction of the capacitor. The notches 43 and 51 help hold adajcent plates 40 in the proper spaced relationship to each other by confining the bent tabs 42 of those plates. The bent tabs 42 of the plates 40 help hold the spacers 50 in the proper alignment within the stack. Thus during stacking of the plates 40, welding of the tabs 42, and encapsulating of the components with a housing 93, the plates should be in the proper alignment.

Thus, a capacitor constructed according to the present invention has a reduced equivalent series inductance due to the cancellation effect of stray inductance by means of horizontal stacking of the flat plates in the capacitor. A reduction in the equivalent series inductance thereby reduces the impedance of the device and improves the relative performance of the device due to lower power loss. Also since each plate acts as a dissipator, a stacked plate capacitor according to this invention will be able to withstand a higher ripple current.

The following examples are illustrative of stacked plate capacitors constructed according to this invention.

EXAMPLE I

A series of circular shaped plates 10 are cut from a roll of highly etched aluminum foil (not shown) with a thickness of about 0.0035 inch, each plate having an integral tab 12 and a notch 13 of slightly larger width than the tab, the notch being located on the opposite side of the foil plate from the tab. The plates 10 have a diameter of approximately 3 inches. Larger plate diameters would yield greater capacitance and conversely, smaller diameters would yield less capacitance. Certain foil plates 10 are anodized either before or after cutting to form a dielectric oxide layer (not shown) on the surface of the foil plates.

The cut foil plates 10 are stacked in a vertical column with a plastic separator material 30 between each foil plate, the plastic separator material being slightly larger in area than the foil plates. The foil plates 10 are alternated as to position of the tab 12 so that adjacent foil plates have their tabs projecting in opposite directions and directly in line with the notch 13 of the adjacent foil plate.

A plurality of foil plates 10 are stacked in this manner and then the tabs 12 which project in the same direction are bent approximately perpendicular to the plane of the foil plates. The tabs 12 of each side are then welded together to form two electrodes 61 and 62, one electrode to act as a cathode and the other electrode as an anode in the capacitor (not shown). The electrodes pass outside of the stacked plate volume and are unable to contact plates of opposite polarity due to the notches in those plates.

The electrodes 61 and 62 are connected by lead means 96 to external terminals 95 located on a non-conductive seal or end portion 94 composed of nylon that is used for closing an open end of the housing 93. If the housing 93 is composed of a conductive material, the stack of foil plates 10 and dielectric spacers 18 is wrapped in an electrically insulative material such as plastic film (not shown) and stacked on a thick, non-conductive spacer 97 so as to isolated the stack from the housing. The whole assembly of plates 10, electrodes 61 and 62, separators 30, spacer 97, and end seal 94 is inserted into a cylindrical aluminum housing or can 93, impregnated with an electrolyte (not shown) and the ends of the can crimped over the seal to complete the encapsulation. The electrolyte, either in a liquid or semi-liquid form, is preferably one of low viscosity and low resistivity such as glycolborate.

EXAMPLE II

A series of rectangular shaped plates are cut from a roll of highly etched aluminum foil with a thickness of about 0.0035 inch, each plate having an integral tab and a notch of slightly larger width than the tab, the notch being located on the opposite side of the foil plate from the tab. The edges of the tab are extended into the plate area by slits, the length of the slit being slightly less than the depth of the notch. The plate dimensions are approximately 3 inches by 5 inches. The plates are anodized as in Example I.

A rectangular plastic separator of approximately the same shape and size is utilized with the etched foil plates. The separator has notches corresponding to the position of the notch and the tab of the metal plate.

A plurality of plates and separators are stacked in the same manner as was done in Example I. The tabs of the plates are bent approximately perpendicular to the plane of the foil plates and through the corresponding notches of the plates and separators. Thus termination of the plates takes place inside the stacked plate volume and the completed stack has a regular outline.

The capacitor is completed in the same manner as was set forth in Example I.

The embodiments of the invention are not limited to substantially rectangular and rounded shaped plates but can include other geometric configurations also. Although square and rounded shaped plates are probably the easiest and least expensive to fabricate, plates with other general shapes, such as, and not limited to, oval shapes, irregular shapes, diamond shapes, elliptical shapes, multi-angled shapes, and figure-eight type shapes could possibly be utilized in accordance with the present invention.

Feed-through devices can also be made utilizing the present invention by employing more than one tab 12 per plate 10. Possible plate configurations for a feed-through capacitor utilizing a circular shaped plate 11 with two tabs 12 include having the tabs on opposite sides of the plates and having two notches opposing each other at points ninety degrees from the projection of the tabs (not shown). Another possible configuration for a feed-through capacitor utilizing a circular shaped plate 11 with two tabs 12 is having the two tabs project at right angles to each other with notches opposite each tab.

The above possible feed-through configurations are given as examples only and the invention is not limited to these examples but comprehends capacitors employing a plurality of tabs per plate constructed in accordance with the design of this invention.

While particular embodiments of the invention have been illustrated and described, numerous variations and modifications thereof may be made by those skilled in the art without departing from the scope and spirit of the present invention. Accordingly, it is intended by the appended claims to cover all such variations and modifications.

We claim:

1. A stacked plate capacitor comprising flat conductive plates having at least one tab per plate which extends beyond the plate area and at least one notch, the number of which is equal to the number of tabs per plate and of physical dimensions sufficient to allow tabs from another plate to pass in a perpendicular plane to the plate without contacting the plate, dielectric separators of approximately the same size as the plates, where the plates and separators are stacked and interleaved with the notches aligned and the plates alternated with each other as to position of the tab or tabs in the stack so that the tab or tabs of each plate are aligned with the notches of the plates nearest to them, and the tabs bent so as to project in a direction approximately perpendicular to the plane of the plates and to contact those tabs of plates in the same spacial position so as to form anode and cathode electrodes of the capacitor, conductive lead means attached to the respective electrodes and lying generally along the direction of the bent tabs, and containing means having external contact means which are connected to the conductive lead means.

2. A capacitor according to claim 1 wherein the separators contain at least one notch approximately equal in size as the notches in the plates, and the plates stacked so as to have the tabs project through the notches of the adjacent plates and separators.

3. A capacitor according to claim 2 wherein the edges of the tabs of the plates are extended into the plate area by slits.

4. A capacitor according to claim 3, wherein the flat conductive plates consists essentially of a metal selected from the group of aluminum, tantalum or niobium, preferably aluminum.

5. A capacitor according to claim 4, wherein the plate is an etched metal to provide more surface area and has dielectric oxide on the surface.

6. A capacitor according to claim 5, wherein the capacitor includes an electrolyte.

7. A capacitor according to claim 6, wherein the plates are of a generally circular shape.

8. A capacitor according to claim 1, wherein the tabs are integral with the plates.

9. A method of making a capacitor of claim 1 comprising the steps of stacking tabbed and notched conductive plates in such a manner as to alternate the spacial relationship of the extended tabs and interleaving the plates with a dielectric separators; bending tabs that project in the same direction to a plane approximately perpendicular to that of the plates, attaching connective lead means which lie in the same direction as the bent tabs to the tabs of the anode and cathode plates respectively; enclosing components in containing means with lead means attached to external contact means on the containing means.

10. A method according to claim 9, wherein the tabs are bent so as to project through the notches of some of the plates.

* * * * *